(12) United States Patent
Moreau et al.

(10) Patent No.: US 6,874,685 B1
(45) Date of Patent: Apr. 5, 2005

(54) CONTACTLESS PAYMENT METHOD AND DEVICE, USING A RE-USABLE CARD

(75) Inventors: Jean-Louis Moreau, Etrechy (FR); Marcel Simonin, Bretigny sur Orge (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/554,002
(22) PCT Filed: Oct. 4, 1999
(86) PCT No.: PCT/FR99/02353
§ 371 (c)(1), (2), (4) Date: May 9, 2000
(87) PCT Pub. No.: WO00/21040
PCT Pub. Date: Apr. 13, 2000

(30) Foreign Application Priority Data
Oct. 5, 1998 (FR) .............................. 98 12429

(51) Int. Cl.[7] .............................................. G07B 15/02
(52) U.S. Cl. ........................ 235/384; 235/380; 705/26
(58) Field of Search ................................. 235/384, 380; 705/26

(56) References Cited
U.S. PATENT DOCUMENTS 4,977,501 A    12/1990  Lefevre
5,043,561 A  *  8/1991  Kimata ........................ 235/384
5,086,389 A  *  2/1992  Hassett et al. .............. 364/401
5,382,778 A  *  1/1995  Takahira et al. ............ 235/380
5,414,249 A  *  5/1995  Matsumoto .................. 235/384
5,534,685 A  *  7/1996  Takemoto et al. .......... 235/487
5,606,158 A  *  2/1997  Takemoto et al. .......... 235/380
5,831,547 A  * 11/1998  Ohtsuki et al. ........ 340/825.54
5,877,484 A  *  3/1999  Hirose ........................ 235/382

FOREIGN PATENT DOCUMENTS

| EP | 0 345 980 A2 | 12/1989 |
| EP | 0 361 110 A2 | 4/1990 |
| EP | 0 654 288 A1 | 5/1995 |
| EP | 0 762 341 A2 | 3/1997 |
| GB | 2 246 896 A | 2/1992 |
| GB | 2 267 626 A | 12/1993 |
| WO | WO 91/14237 | 9/1991 |
| WO | WO/96/07164 | 3/1996 |

* cited by examiner

*Primary Examiner*—Michael G. Lee
*Assistant Examiner*—Seung H Lee
(74) *Attorney, Agent, or Firm*—Sughrue Mion, PLLC

(57) ABSTRACT

In a transport system using contactless microcircuit cards, users are obliged to hand in a card when the credit shown on it has been used up. The value of the cards is recharged and they are then sold again. Recovering and recharging the cards reduces the ticketing cost per journey.

20 Claims, 2 Drawing Sheets

CONTACTLESS PAYMENT METHOD AND DEVICE, USING A RE-USABLE CARD

BACKGROUND OF THE INVENTION

The present invention consists in a contactless payment method and device using a rechargeable medium. The medium is typically a microcircuit card ("smart card") which can be read and written without physical contact via a radio link, but the invention can be applied to all rewritable media which can be read and written without contact. Some smart cards which can be read and written using a radio link can also be read by contact (magnetically, optically or electrically) and so can also be read and written by contact readers, i.e. readers which require the card to be inserted into a machine.

The method of the invention is more particularly intended to be used in the field of travel tickets. It is described in relation to that field, but other fields are feasible, in particular automatic dispensing.

Travel tickets are generally on a single-use medium, for example paper tickets carrying a magnetic stripe, because their cost is low compared to the fare. The user discards the ticket when a predetermined journey or a predetermined number of journeys has been completed or when an expiry date has been reached. Those media are read by contact in a reader.

Payment methods using a contact reader have the disadvantage of a low throughput of users, because each user takes some time to stop in front of a gate, take the ticket out of a pocket or handbag, insert it into a machine and recover it. It is necessary to provide parallel gates to increase the throughput of users.

For several years now, public transport ticketing systems have been evolving from the use of conventional tickets towards the use of contactless smart cards. However, the cost of these contactless cards (several hundred times the cost of a paper ticket with magnetic stripe) limits their use to season tickets or rechargeable tickets (tickets that the user can "recharge" in an automatic machine accepting payment by banknotes, coins or credit card), to retain a ratio close to one percent between the cost of the ticket per journey and the fare. Consequently, conventional tickets continue to be used either for all users or at least for occasional users who purchase tickets valid for only one journey ("single-journey tickets").

Contactless smart cards are currently being used as public transport tickets on an experimental basis in France (Paris and Marseille) and for real (Seoul, Hong Kong, Washington, etc.). The system is generally referred to as teleticketing. To carry out all the standard functions of a microcircuit card, such as writing, reading, authentication, etc., the card can communicate over a short distance (approximately ten centimeters) with a coupler provided with an antenna. It usually also receives the power needed for it to operate from the antenna. This type of remote communication is currently being standardized by ISO Standard 14443. There are also combined cards operating without contact for transport access transactions and with contact for personalization or recharging transactions using standard contact equipment.

The teleticketing system has a number of advantages over conventional paper or magnetic stripe tickets:

there is no need to insert the ticket into a slot and recover the ticket from the same slot or an outlet chute, which reduces the overall time of a transaction by eliminating the human action and reaction times, and the electronic transaction time is short (approximately 100 ms to 200 ms) compared to a magnetic stripe transaction (from 500 ms to 1 000 ms), these two features increasing the throughput at the control point, which leads to a reduction in the number of control points;

users retain the ticket in the hand (or handbag), which eliminates the risk of loss or theft of the ticket at the time of payment;

more data can be stored in the memory card than on a magnetic stripe ticket and operators can therefore add to their knowledge of how the transport network is used;

a teleticketing reader is less costly than a magnetic stripe reader (by a factor of approximately 5);

the reader requires less maintenance because there are no mechanical moving parts;

the scope for vandalism is limited;

the scope for differential fare structures is extended; and other applications (electronic purse) are also possible.

On the other hand, the cost of a contactless ticket is much higher than that of a magnetic stripe ticket (by a factor of at least 1000) and in practice incompatible with the fare for a single journey or the cost of a basic service which can be paid for using a ticket of this kind. It is not feasible to use a medium of this kind to pay for a single journey and then discard it.

The contactless smart card is therefore restricted to season tickets and rechargeable tickets. In the transport field, where occasional users represent approximately 20% of all passengers and account for approximately 40% of revenue (because single-journey tickets do not benefit from reduced fares), cheap media continue to be used for single-journey tickets, for example paper tickets with a magnetic stripe. This significantly reduces the benefit of teleticketing because the need for the two systems to co-exist increases installation and maintenance costs and limits throughput.

In the field of conventional ticket ing, the problem of the coexistence of two systems has been solved (in Asia in particular) by using plastics material magnetic stripe cards to the standard format for all types of tickets, instead of using plastics material cards for season rickets and rechargeable tickets and paper or card single-journey tickets. The cost of manufacturing each plastics material card is greater than that of a paper or card ticket, but very much less than the cost of a smart card. The cost problem is solved by recycling, which reduces the cost per journey. A magnetic stripe card inserted into a reader is retained by the reader when it has no further value. After checking its physical condition, its value is recharged by rewriting it magnetically, and it is then sold again. In this way it can be used several hundred times, which reduces the cost per journey and therefore avoids the need for two systems to co-exist.

A transport company has no difficulty in recovering the magnetic stripe cards because all users must in all cases insert their magnetic stripe card into a terminal which reads the magnetic stripe on the card, possibly writes data on it, and then unlocks a gate or a barrier if the card shows sufficient credit for a journey. The cycle of use of a magnetic stripe card in the case of centralized recycling in a metro network is as follows:

1—Passengers purchase their tickets (single-journey tickets, rechargeable tickets or time-period tickets, etc.) from an automatic dispenser or at a ticket office.

2—The ticket is inserted into the reader of a terminal which controls physical entry and exit of passengers.

3—At the exit, the ticket is returned to the user if, after processing, it still has some value (sufficient credit for one or more journeys or a sum of money), or if the expiry date has not been reached.

4—The ticket is retained by the exit terminal if it shows no value after processing (which applies to all single-journey tickets).

5—In the case of centralized recycling, the recovered tickets are taken to a sorting center. They are checked to see if they can be used again. Those which can be used again are sorted by category.

6—The sorted tickets are returned to ticket offices or automatic dispensers and are magnetically written with the appropriate value when they are issued.

The above description is somewhat simplified. Rechargeable tickets can be processed differently. Users can recharge them for themselves at an automatic machine accepting payment by banknote, coin, or credit card. In this case they are neither retained nor recycled by the gate. Other variants are equally possible. The current trend is for decentralized recycling at each station. The tickets are sorted in each gate, which limits the circulation of the tickets but complicates the gates.

To summarize, well known in the art are: payment methods using low-cost media, read by contact in a reader, but with the problem of a low throughput of users; and payment methods using contactless media achieving a fast throughput of users but causing a problem in terms of the cost of the media which leads to their use being restricted to certain tickets so that two ticketing systems have to co-exist.

SUMMARY OF THE INVENTION

The object of the invent-on is to encourage the use of contactless media for low-value payments.

The invention consists in a contactless payment method using a rechargeable medium, consisting in:
  offering up the medium in the vicinity of a contactless reader, and
  debiting the medium with the cost of a requested service if the credit shown on the medium is at least equal to that cost,
  characterized in that, to oblige the user to hand in the medium when the credit shown by the medium is less than a fixed amount, it further consists in
  verifying if the credit shown by the medium is less than a fixed amount and, if it is, inviting the user to hand in the medium they are using, and
  providing a service only after the user has handed in the medium.

The user is therefore obliged to give up the medium so that it can be recycled. For example, in the case of travel tickets, the method consists in reading the medium without contact and then opening a gate to allow the user to pass through at the beginning and/or at the end of the journey if the medium still contains sufficient credit for at least one more journey. On the other hand, if the credit has been used up by the journey currently being paid for, or which has just been completed, the user is requested to insert the medium into a machine that retains it and then opens the gate. For example, the user is obliged to give up the medium by making the opening of an entry or exit gate associated with a controlled area conditional on giving up the medium. If users do not give up the medium, they cannot enter or leave the controlled area.

The medium can be given up by inserting it into a machine similar to a standard terminal associated with a standard gate. Thus the medium is used most of the time without contact, which enables a high throughput of users, and is exceptionally used as a standard contact medium on the occasion on which it must be given up. On that occasion, a user must take the card out from a pocket or handbag and insert it into a terminal in order to give it up. The procedure then takes longer than usual, but overall the method provides for a high throughput of users because contactless reading means that most users pass through the gate quickly.

Recycling single-journey tickets of occasional travelers, and possibly rechargeable tickets, reduces their cost and therefore generalizes the use of contactless media.

Recycling single-journey tickets divides the cost of the medium per transaction by the number of times it is used. For example, a medium costing around 10 French francs and used 500 times has a cost per transaction of 2 centimes, comparable to that of an Edmonson format magnetic stripe paper ticket.

The payment system preferably physically obliges a user to return the medium when invited to do so. The method of the invention is therefore more particularly intended for systems with turnstiles or gates for physically controlling the movement of passengers. It can nevertheless also be applied to payment systems including validating units with no physical access control. In this case, the method of the invention merely uses signals to tell the user that access is refused (by displaying a message and actuating an audible warning device).

BRIEF DESCRIPTION OF THE DRAWING

The invention will be better understood after reading the following description and examining the accompanying drawings. The drawings are given exclusively by way of illustrative and non-limiting example of the invention. The figures show.

DETAILED DESCRIPTION OF THE INVENTION

Figure 1:
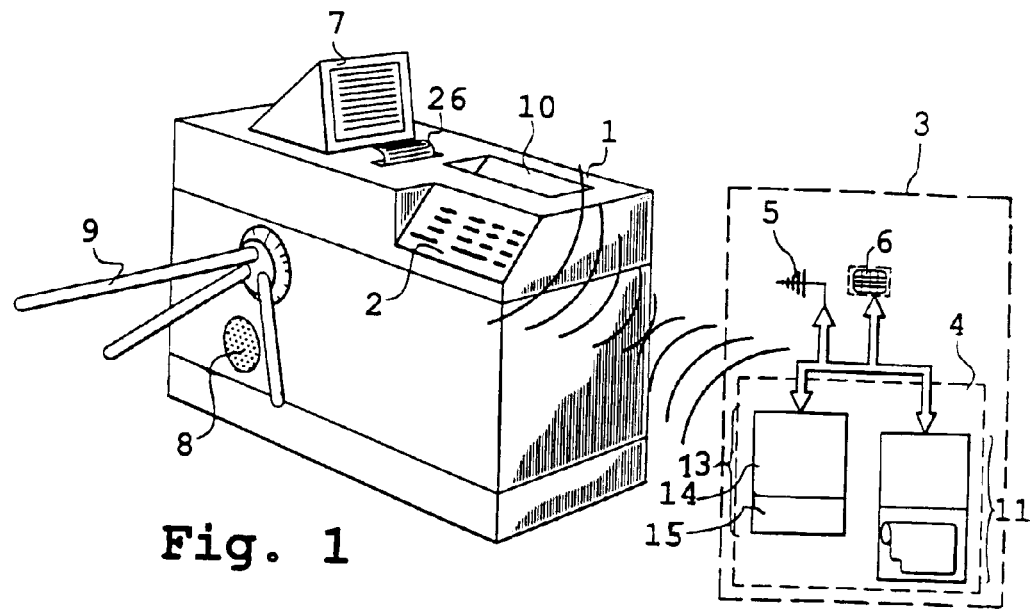
FIG. 1: one example of a terminal and a microcircuit medium which be used to implement the method of the invention in the transport field.

This example corresponds to a mode of use in which the terminal controls entry into a controlled area. FIG. 1 shows:
  a terminal 1 which includes a contactless reader having an antenna 2 under a cover that is transparent to electromagnetic radiation, and
  a contactless medium in the form of a smart card 3 incorporating a microcircuit 4 communicating with the outside world via an antenna 5 and optionally a connection interface 6 with electrical contacts.

The terminal 1 is in the form of a cabinet alongside a passageway blocked by a three-legged turnstile 9. The terminal 1 further includes.
  a display 7 and a loudspeaker 8 for imparting information to a user, and
  a collection device essentially consisting of a collecting chute 10 into which the user slides or throws the smart card at the invitation of the display 7 and the loudspeaker B.

The smart card 3 includes:
  standard means, not shown, for extracting the electrical power required for it to operate from the electromagnetic signal received by its antenna 5, standard means, not shown, for transmitting and receiving data via the antenna 5, a logic circuit 11 for processing the data (for example a microprocessor and an associated program), in particular for effecting a payment operation and securing the data exchanged with the terminal 1, and a non-volatile memory 13 containing transaction data.

A credit is stored in a portion 14 of the memory 13. Some credit units are electronically canceled by the circuit 11 to show that their value has been used up. A second portion 15 of the memory 13 contains an identifier, for example the user's Social Security number.

Figure 2:
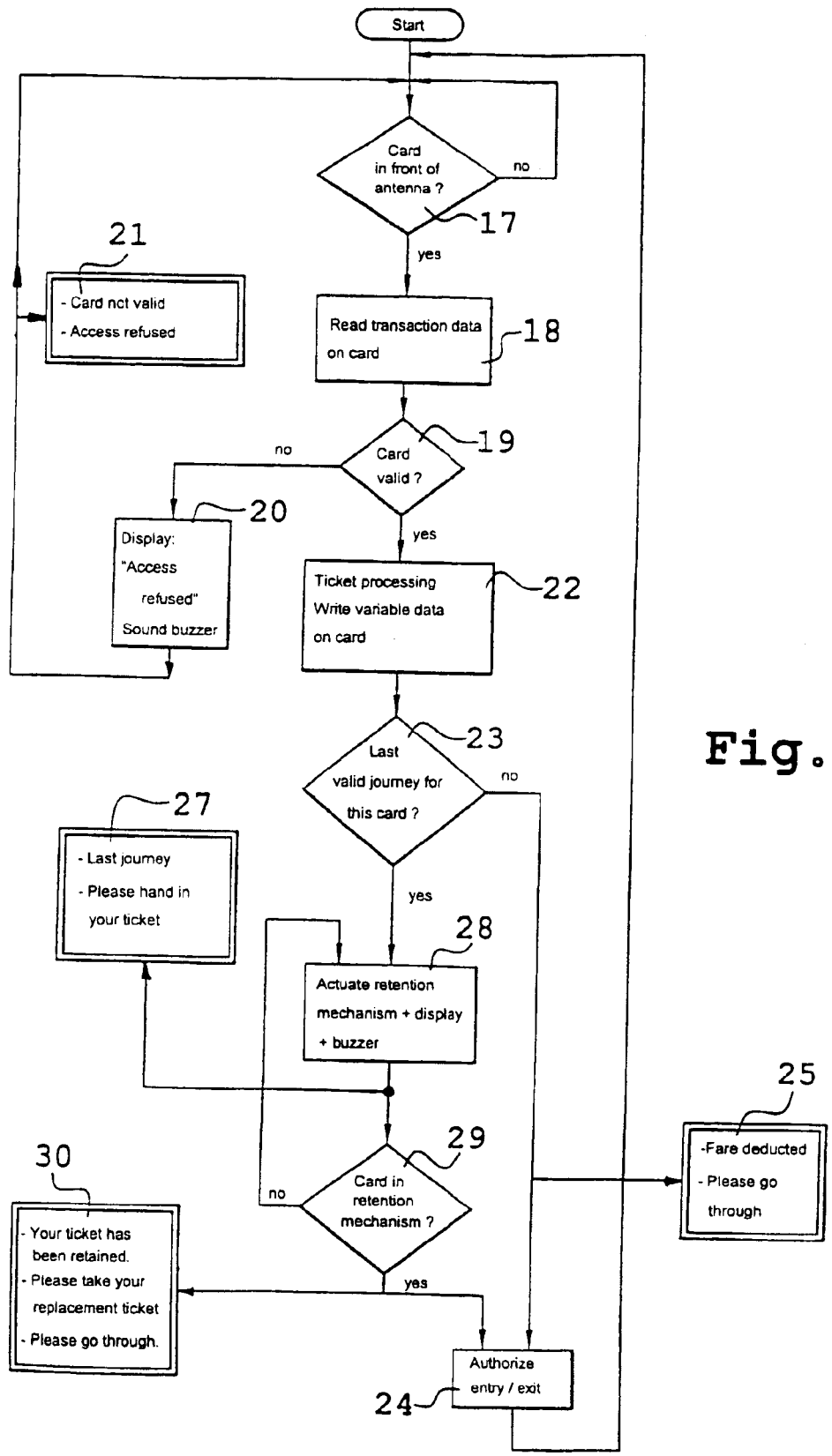
FIG. 2: a flowchart showing the successive steps of the method of the invention.

FIG. 2 is a flowchart of one example of the method of the invention. When a user with a smart card 3 approaches the terminal 1, the contactless smart card reader detects the presence of the microcircuit 4. This is step 17 in FIG. 2. When the card 3 receives the signals transmitted by the antenna 2, it transmits data to the reader in the terminal 1.

In step 18 the reader in the terminal 1 reads the transaction data contained in the memory 13 of the card 3. The reader then performs a test to determine if the card is valid (step 19). The test verifies if the card 3 corresponds to the intended purpose of the terminal 1:

The card 3 may not correspond to the transport company operating the terminal 1. In this case, the card is refused but is not retained. A message on the screen 7 and a sound signal or message reproduced by the loudspeaker 8 indicate that the card does not authorize access (step 20).

If the card is valid, the reader in the terminal 1 modifies the credit stored in the portion 14 of the memory 13 (step 22). It causes the circuit 11 to write data. After this writing, the card may not be valid for a subsequent journey. The reader in the terminal 1 tests whether the card is valid for another journey by comparing the remaining credit to a predetermined amount (step 23):

If the card is still valid for another journey, or another use, the reader authorizes entry/exit (step 24). The reader commands the unlocking of a latch which prevents the barrier 9 rotating. It displays on the screen 7 a message 25 indicating that the use of the service has been accounted for and inviting the user to pass through the barrier. The display can be replaced by the lighting of a green lamp or any other visual and/or audible and/or mechanical signal. In this instance, all that remains is for the user to pass through the barrier.

If the card is not valid for another journey, the user is invited to insert the card into the chute 10 to return it to the transport company (message 27, step 28). This is because, in this example, the terminal 1 controls entry to a controlled area and the user is invited to return the card before making the journey. In return the user is issued a ticket 26 indicating the legitimate nature of his situation during the journey. A message on the screen 7 and/or a sound message reproduced by the loudspeaker 8 then indicates that the card must be given up by inserting it into the chute 10 (step 28). At the same time, the terminal 1 prepares to retain the card. Meanwhile, the barrier remains locked. A test verifies whether the card has been returned (step 29):

If it has, a message 30 on the screen 7 and/or an audible message reproduced by the loudspeaker 8 invite(s) the user to take the ticket 26 and pass through the barrier 9. The barrier 9 is then unlocked (step 24).

If it has not, the barrier 9 is not unlocked. At the end of a predetermined time the terminal 1 reverts to step 1 to detect the card of another user.

In another mode of use, the terminal 1 controls exit from the con-rolled area. In this case, users are invited to hand in their card at the end of the journey, but there is no need to issue a ticket 26 in exchange.

Figure 3:
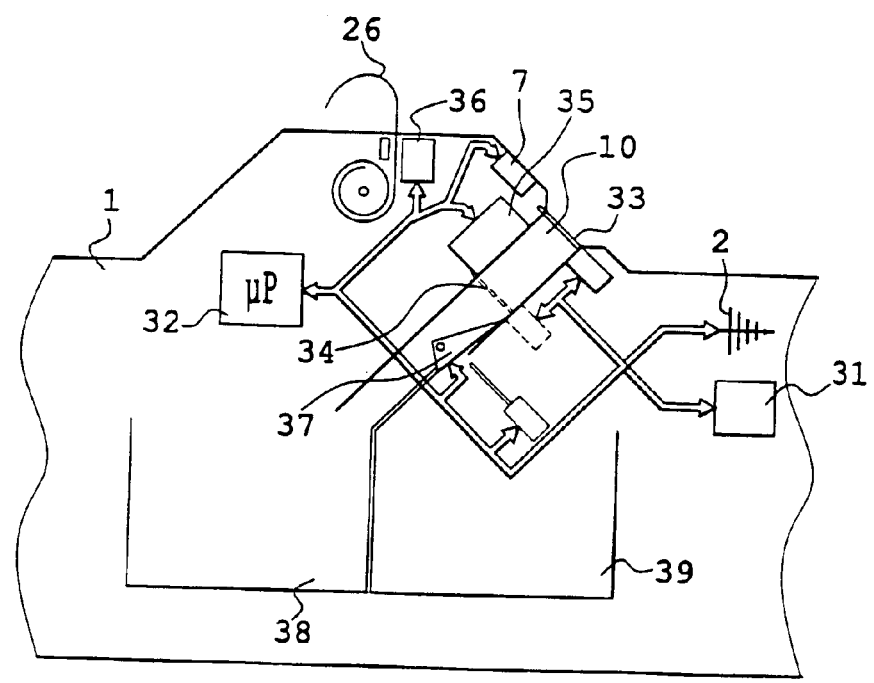
FIG. 3: a more detailed representation of the terminal from FIG. 1.

FIG. 3 shows the construction of the terminal 1 in more detail. Its main components include a printer 36, a contactless reader 31 connected to the antenna 2 and a microprocessor 32. To prevent entry of foreign bodies into the chute 10, the chute is provided with an access door 33. The microprocessor 32 opens the door 33 only when it receives from the reader 31 information indicating the presence of a card 3 whose credit has just been used up and is therefore to be handed in. In all other cases, the door 33 remains closed.

For implementing the test of step 29, the chute 10 has another door 34 further downstream and also controlled by the microprocessor 32. The door 34 retains in the chute 10 a card 3 or any other object deposited therein. During this time, the nature of the object is tested. To this end, a detector 35 faces the chute 10, slightly above the door 34. The detector 35 can be a very simple device, for example an optical or infrared detector. It can also be an antenna of the same type as the antenna 2 and which is coupled to the reader 31 to read the memory 13 of the deposited card.

If the presence of a card 3 is detected in the chute 10, the processor 32 authorizes user entry or exit, opens the door 34 and causes the printer 36 to deliver a ticket 26. All the operations are timed and synchronized so that they can be efficiently perceived by the user.

If no card 3 is detected in the chute 10, the microprocessor 32 leaves the door 34 closed and does not unlock the barrier 9. If a foreign object has been inserted, it remains in the chute 10 and the door 33 remains open until a user removes the foreign object and deposits a card.

A routing device 37 controlled by the microprocessor 32 can optionally divide cards into two categories. To remedy the insertion of foreign objects, the routing device 37 can also separate cards from other objects thrown into the chute 10. To this end, the receptacle of the terminal 1 includes two hoppers 38 and 39. The cards can be stored loose in these hoppers or stacked to facilitate their re-use.

In practice the entry slot above the door 33 is shaped to facilitate inserting the card. The opening can be wider than the entry slot of a magnetic stripe reader because its guide function is less precise, to facilitate fast insertion of the card.

The two doors 33 and 34 are preferably actuated so that opening of the door 34 is followed a second test by the detector 35 to verify that the card is no longer present before authorizing re-opening of the door 33. This prevents removal of cards by so-called "fishing" methods.

Cards valid for a single journey (single cards) do not need to be recharged and can be recycled without rewriting their memory. The other tickets are recharged by writing a new value into the microcircuit 4. A secret key is generally required for recharging the microcircuit 4. The security precautions in respect of the secret key are simpler because the value is recharged only by employees of the company owning the terminal 1.

The recycling mode is preferably adapted to suit particular operating conditions. In the situation where only single cards are recycled and then dispensed automatically, the collected cards are stacked in the hoppers without recharging their value. They are recharged at the time they are sold. For manual distribution to ticket offices of stations equipped with a reader for recharging their value, the cards are stacked in boxes without recharging their value. Their value is recharged at the time they are sold. For distribution by external resellers, who have no means of recharging their value, the tickets have their value recharged by a secure dedicated equipment unit belonging to the transport company.

The cards can be stacked any way around, unlike magnetic stripe cards, which simplifies the mechanism in the terminals.

What is claimed is:

1. A contactless payment method using a rechargeable medium, comprising:
   offering up the medium in the vicinity of a contactless reader; and
   debiting the medium with the cost of a requested service if a credit shown on the medium is at least equal to said cost;
   wherein, to oblige the user to hand in the medium when the credit shown by the medium is less than a fixed amount, said contactless payment method further comprises,
      verifying if the credit shown by the medium is less than a fixed amount and, if so, inviting the user to hand in the medium that the user is using, and
      providing a service only after the user has handed in the medium.

2. The method according to claim 1, wherein a light and/or sound and/or mechanical signal invites the user to hand in the medium.

3. The method according to claim 1, wherein a first door opens to invite the user to hand in the medium.

4. The method according to claim 3, wherein for verifying that each object handed in by a user is a rechargeable medium, said contactless payment method comprises:
   collecting the handed-in object in a collection chute under the first door;
   retaining the object in the chute by means of a second door;
   verifying that the object in the chute is a rechargeable medium; and
   opening the second door if the object handed in is a rechargeable medium.

5. The method of claim 4, wherein if said user inserts an object that is not said rechargeable medium, said first door remains open until said user removes said object and deposits said rechargeable medium.

6. The method according to claim 1, wherein said contactless payment method further comprises;
   verifying that each object handed in by a user is a rechargeable medium, and
   providing a service only if the object is a rechargeable medium.

7. The method according to claim 1, wherein said contactless payment method further comprises sorting collected media into different hoppers of the receptacle according to the nature of the media.

8. The method according to claim 1, wherein said contactless payment method further comprises delivering to each user handing in their rechargeable medium a ticket indicating that they have handed in their rechargeable medium.

9. The method according to claim 1, wherein, to debit the cost of a requested service, said contactless payment method writes data into a memory of a microcircuit incorporated in the medium.

10. The method of claim 1, wherein if said user hands in an object other than said rechargeable medium, said object is refused but not retained.

11. A contactless payment device using a rechargeable medium, comprising:
    a contactless reader, and
    means for debiting, in the medium, the price of a requested service if the credit shown on the medium is at least equal to that price,
    wherein, to invite the user of the medium to hand in the medium when the credit shown on the medium is less than a fixed amount, said contactless payment device includes:
    means for verifying if the credit shown on the medium is less than a fixed amount,
    means for inviting the user to hand in the medium they are holding if the credit shown on the medium is less than a fixed amount,
    means for collecting the handed in medium, and
    means for supplying a service only after the user has handed in the medium.

12. The device according to claim 11, wherein the means for inviting the user to hand in the medium include luminous signal emitting means and/or audible signal emitting means and/or mechanical signal emitting means.

13. The device according to claim 12, wherein the means for inviting the user to hand in the medium include a first door and means for opening the door.

14. A device according to claim 13, wherein said contactless payment device further comprises:
    means for verifying that each object handed in by a user is a rechargeable medium; and
    means for providing a service only if the object is a rechargeable medium.

15. The device according to claim 14, wherein said contactless payment device further comprises:
    a second door downstream of the first door and a chute between the two doors; and
    means for opening the second door only if the verifying means indicate that an object placed in the chute is a rechargeable medium.

16. The device of claim 15, wherein if said user inserts an object that is not said rechargeable medium, said first door remains open until said user removes said object and deposits said rechargeable medium.

17. The device according to claim 11, wherein said contactless payment device further includes means for routing collected media to different hoppers according to the nature of the media.

18. The device according to claim 11, wherein said contactless payment device further includes means for delivering to each user who has handed in a rechargeable medium a ticket indicating that they have handed in their rechargeable medium.

19. The device according to claim 11, wherein, to debit the cost of a requested service, said contactless payment device includes means for writing data in a memory of a microcircuit incorporated in the medium.

20. The device of claim 11, wherein if said user hands in an object other than said rechargeable medium, said object is refused but not retained.

* * * * *